(12) United States Patent
Seo et al.

(10) Patent No.: US 9,344,909 B2
(45) Date of Patent: May 17, 2016

(54) METHOD AND APPARATUS FOR MONITORING A WIRELESS LINK IN A WIRELESS COMMUNICATION SYSTEM

(75) Inventors: Hanbyul Seo, Anyang-si (KR); Joonkui Ahn, Anyang-si (KR); Inkwon Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 158 days.

(21) Appl. No.: 14/131,890

(22) PCT Filed: Jul. 23, 2012

(86) PCT No.: PCT/KR2012/005865
§ 371 (c)(1),
(2), (4) Date: Jan. 9, 2014

(87) PCT Pub. No.: WO2013/015588
PCT Pub. Date: Jan. 31, 2013

(65) Prior Publication Data
US 2014/0153427 A1 Jun. 5, 2014

Related U.S. Application Data

(60) Provisional application No. 61/511,505, filed on Jul. 25, 2011, provisional application No. 61/560,796, filed on Nov. 16, 2011, provisional application No. 61/602,075, filed on Feb. 22, 2012.

(51) Int. Cl.
*H04W 24/08* (2009.01)
*H04L 1/20* (2006.01)
(Continued)

(52) U.S. Cl.
CPC ............ *H04W 24/08* (2013.01); *H04B 7/0456* (2013.01); *H04B 7/0891* (2013.01);
(Continued)

(58) Field of Classification Search
None
See application file for complete search history.

(56) References Cited

U.S. PATENT DOCUMENTS

2009/0264123 A1* 10/2009 Agashe ................. H04W 48/20
455/434
2010/0091641 A1* 4/2010 Gaal ...................... H04B 7/068
370/208
(Continued)

FOREIGN PATENT DOCUMENTS

KR 10-2011-0008300 A 1/2011
WO 2008-157692 A3 12/2008
(Continued)

OTHER PUBLICATIONS

R1-074001 "PMI Downlink Signalling and PDDCH Format", 3GPP TSG RAN1#50bis, Motorola, Shanghai, China Oct. 8-12, 2007.
(Continued)

*Primary Examiner* — Hoon J Chung
*Assistant Examiner* — Yaotang Wang
(74) *Attorney, Agent, or Firm* — Dentons US LLP

(57) ABSTRACT

The present invention relates to a wireless communication system, and more particularly to a method and apparatus for monitoring a wireless link. A method for monitoring a wireless link by a terminal in a wireless communication system according to one embodiment of the present invention comprises the steps of: receiving a precoded control channel; and estimating the quality of the wireless link for the received precoded control channel, wherein the quality of the wireless link can be estimated on the basis of an assumption by the terminal regarding the precoding applied to the precoded control channel.

4 Claims, 11 Drawing Sheets

(a)

(b)

(51) Int. Cl.

| | |
|---|---|
| *H04L 25/02* | (2006.01) |
| *H04L 27/26* | (2006.01) |
| *H04L 5/00* | (2006.01) |
| *H04B 7/04* | (2006.01) |
| *H04B 7/06* | (2006.01) |
| *H04B 7/08* | (2006.01) |
| *H04B 17/309* | (2015.01) |
| *H04L 1/06* | (2006.01) |

(52) U.S. Cl.
CPC ........... *H04B 17/309* (2015.01); *H04L 1/0668* (2013.01); *H04L 1/20* (2013.01); *H04L 25/0226* (2013.01); *H04L 27/261* (2013.01); *H04B 7/063* (2013.01); *H04B 7/065* (2013.01); *H04B 7/0639* (2013.01); *H04L 5/005* (2013.01)

(56) References Cited

U.S. PATENT DOCUMENTS

| | | | |
|---|---|---|---|
| 2011/0080965 A1* | 4/2011 | Liu | H04L 25/0248 375/260 |
| 2011/0096704 A1* | 4/2011 | Erell | H04B 7/0617 370/295 |
| 2011/0149765 A1 | 6/2011 | Gorokhov et al. | |
| 2012/0082052 A1* | 4/2012 | Oteri | H04W 24/10 370/252 |
| 2012/0236798 A1* | 9/2012 | Raaf | H04B 7/0452 370/328 |
| 2014/0112407 A1* | 4/2014 | Nammi | H04B 7/0456 375/267 |

FOREIGN PATENT DOCUMENTS

| | | |
|---|---|---|
| WO | 2010058245 A1 | 5/2010 |
| WO | 2010120217 A1 | 10/2010 |
| WO | 2010-126273 A2 | 11/2010 |
| WO | 2010-149106 A1 | 12/2010 |
| WO | 2011005533 A2 | 1/2011 |
| WO | 2011-074914 A2 | 6/2011 |

OTHER PUBLICATIONS

3rd Generation Partnership Project; Technical Specification Group Radio Access Network; Evolved Universal Terrestrial Radio Access (E-UTRA); Physical Channels and Modulation (Release 8): 3GPP TS 36.211 V8.4.0 (Sep. 2008).

* cited by examiner

FIG. 5
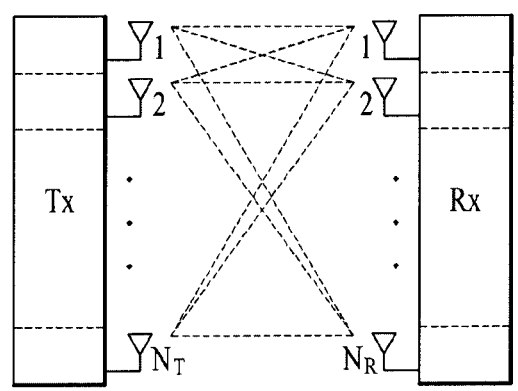
(a)
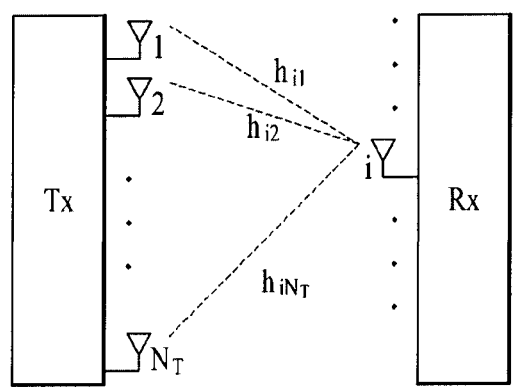
(b)

FIG. 6
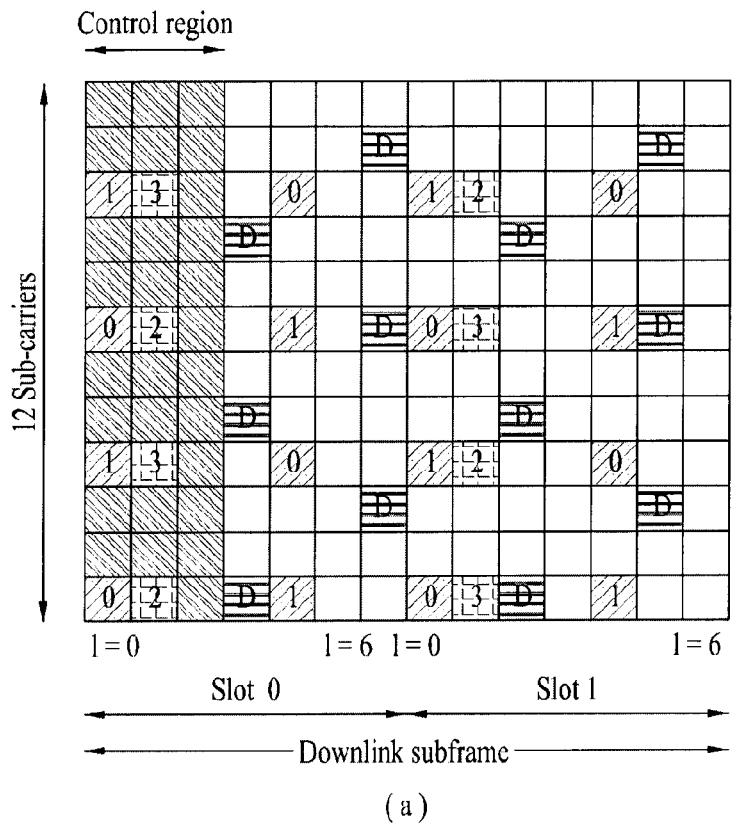
(a)
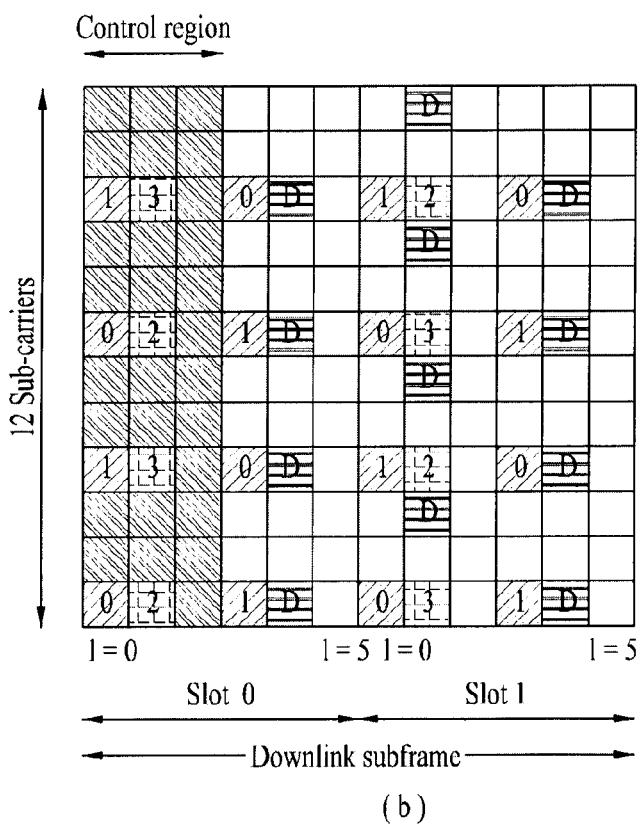
(b)

METHOD AND APPARATUS FOR MONITORING A WIRELESS LINK IN A WIRELESS COMMUNICATION SYSTEM

This application is a 35 USC §371 National Stage entry of International Application No. PCT/KR2012/005865, filed on Jul. 23, 2012, and claims priority to U.S. Provisional Application Nos. 61/511,505 filed Jul. 25, 2011, 61/560,796 filed Nov. 16, 2011 and 61/602,075 filed Feb. 22, 2012, all of which are hereby incorporated by reference in its entirety.

TECHNICAL FIELD

Embodiments of the present invention relate to a wireless communication system, and more particularly to a method and apparatus for monitoring a radio link.

BACKGROUND ART

The quality of a radio link between a base station (BS) (or eNB) and a user equipment (UE) may be degraded due to various factors. When the UE fails to receive a control signal from the BS (for example, if a physical downlink control channel (PDCCH) is correctly decoded), this may be defined as a Radio Link Failure (RLF). To handle the RLF, the UE first detects a problem at a physical layer and attempts to solve the physical layer problem. If the UE fails to recover from the physical layer problem, the UE may transmit a connection re-establishment request to the BS, after determining that an RLF has been detected.

DISCLOSURE

Technical Problem

In order to maintain/recover connection between the BS and the UE, there is a need to correctly perform radio link monitoring (RLM). If the RLM result does not correctly estimate a radio link quality, the UE declares RLF even in a good radio link quality so that an unnecessary operation occurs. Alternatively, the UE does not declare RLF even in a poor radio link quality such that errors of data transmission/reception cannot be solved.

Various techniques for improving control channel (e.g., PDCCH) performance have been proposed in the evolved radio communication system. The probability of PDCCH decoding error in the legacy RLM operation has been defined in consideration of the legacy PDCCH Tx/Rx techniques, such that the legacy RLM result may incorrectly reflect the actual link quality under a new PDCCH Tx/Rx technique.

An object of the present invention is to provide a method for correctly and efficiently performing radio link monitoring (RLM) in consideration of a new control channel Tx/Rx method.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing radio link monitoring (RLM) by a user equipment (UE) in a wireless communication system, the method including: receiving a precoded control channel; and estimating a radio link quality of the received precoded control channel, wherein the radio link quality is estimated on the basis of UE assumption associated with precoding applied to the precoded control channel.

In another aspect of the present invention, a user equipment (UE) for performing radio link monitoring (RLM) in a wireless communication system includes: a reception (Rx) module configured to receive a downlink signal from a base station (BS); a transmission (Tx) module configured to transmit an uplink signal to the BS; and a processor configured to control the UE including the reception (Rx) module and the transmission (Tx) module, wherein the processor receives a precoded control channel through the reception (Rx) module, estimates a radio link quality of the received precoded control channel, the radio link quality being estimated on the basis of UE assumption associated with precoding applied to the precoded control channel.

The following description may be commonly applied to the embodiments of the present invention.

The UE assumption may indicate that a precoding matrix optimal for a downlink (DL) channel estimated by the UE is applied to the precoded control channel.

The downlink (DL) channel may be estimated from a Channel State Information-Reference Signal (CSI-RS) or a cell-specific reference signal (RS).

The optimal precoding matrix may correspond to a Precoding Matrix Indicator (PMI) reported from the UE to a base station (BS).

The UE assumption may indicate that a precoding matrix randomly selected from a predetermined codebook is applied to the precoded control channel.

A transmission (Tx) rank defined in the predetermined codebook may be equal to or less than a transmission (Tx) rank of the precoded control channel.

The UE assumption may indicate that one precoding matrix is applied to the precoded control channel.

The method may further include: demodulating the precoded control channel on the basis of a channel estimated using a UE-specific Reference Signal (RS), wherein the same precoding as precoding applied to the UE-specific RS is applied to the precoded control channel.

Information regarding the precoding applied to the precoded control channel may not be applied to the user equipment (UE).

The radio link quality estimation may be based on a decoding error probability of the received precoded control channel.

The radio link quality may be estimated on the assumption that at least one of the number of slots used for transmission of the precoded control channel, the number of orthogonal frequency division multiplexing (OFDM) symbols, and the number of resource elements (REs) is constant.

The method may further include: receiving a non-precoded control channel; and estimating a radio link quality of the non-precoded control channel, wherein a status of the radio link quality is determined by comparing at least one of a radio link quality of the precoded control channel and a radio link quality of the non-precoded control channel with a predetermined threshold value.

The method may further include: receiving a non-precoded control channel; and estimating a radio link quality of the non-precoded control channel, wherein a status of the radio link quality is determined by comparing at least one of a radio link quality of the precoded control channel and a radio link quality of the non-precoded control channel with a predetermined threshold value.

The precoded control channel may be an Enhanced-Physical Downlink Control Channel (E-PDCCH).

It is to be understood that both the foregoing general description and the following detailed description of the present invention are exemplary and explanatory and are intended to provide further explanation of the invention as claimed.

Advantageous Effects

As is apparent from the above description, the embodiments of the present invention can provide a method for correctly and efficiently performing RLM in consideration of a new control channel Tx/Rx method.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 5 is a diagram illustrating a wireless communication system including multiple antennas.

FIG. 6 is a diagram showing exemplary CRS and DRS patterns.

BEST MODE

Figure 1:
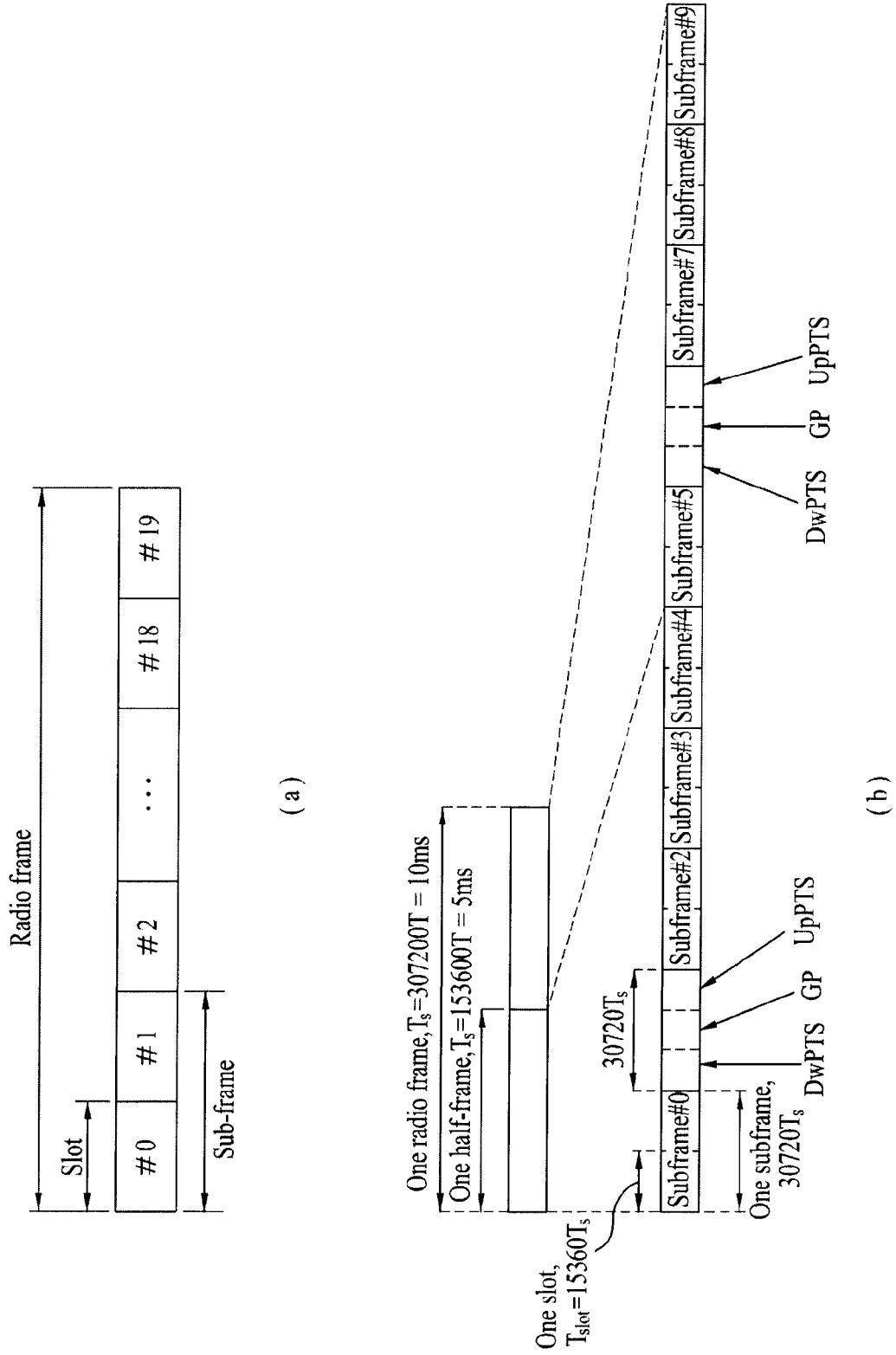
FIG. 1 exemplarily shows a radio frame structure.

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

A radio frame structure will now be described with reference to FIG. 1.

In a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 1(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The aforementioned radio frame structure is purely exemplary and thus the number of subframes included in a radio frame, the number of slots included in a subframe, or the number of symbols included in a slot may vary.

Figure 2:
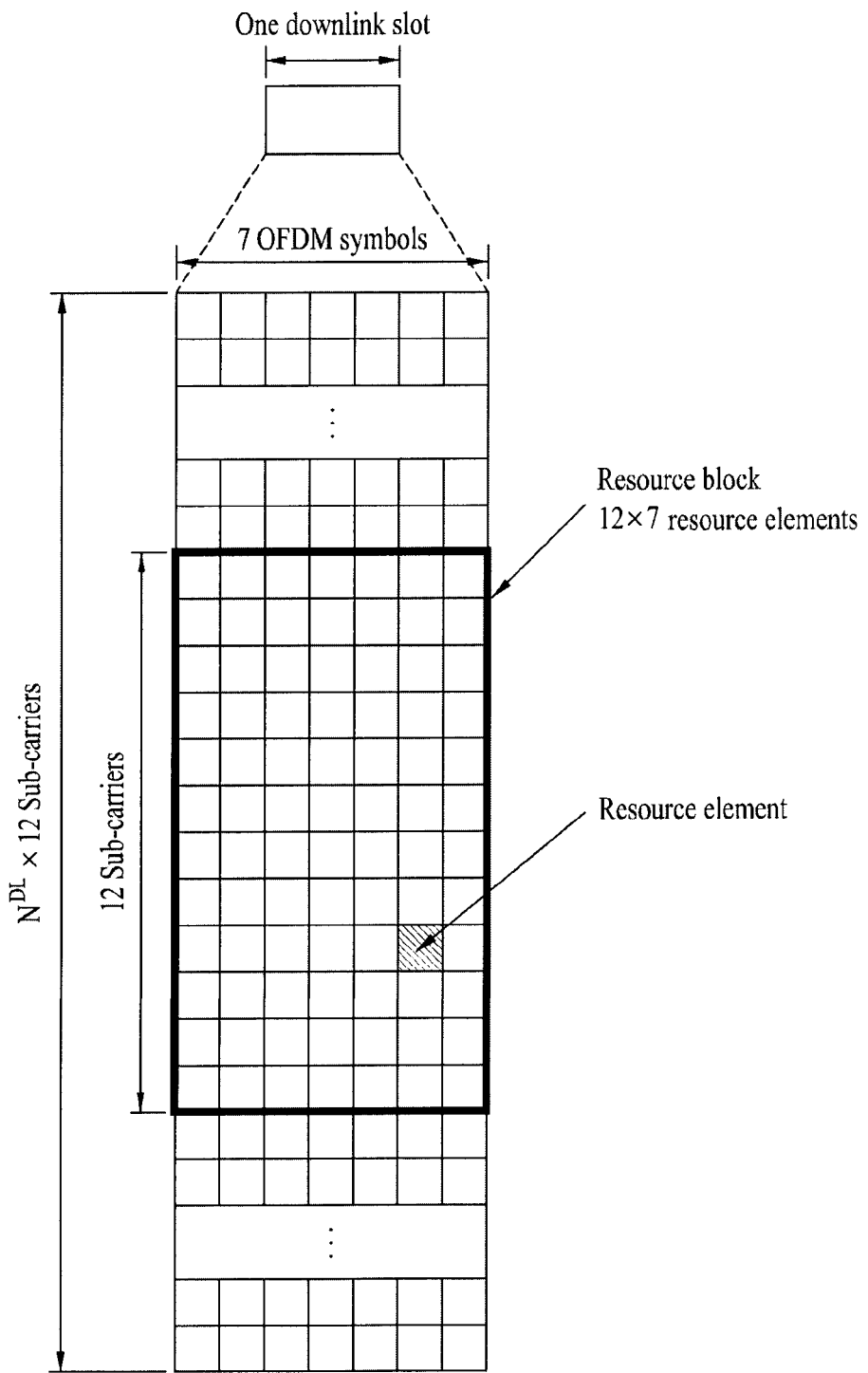
FIG. 2 exemplarily shows a resource grid of a downlink slot.

FIG. 2 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Figure 3:
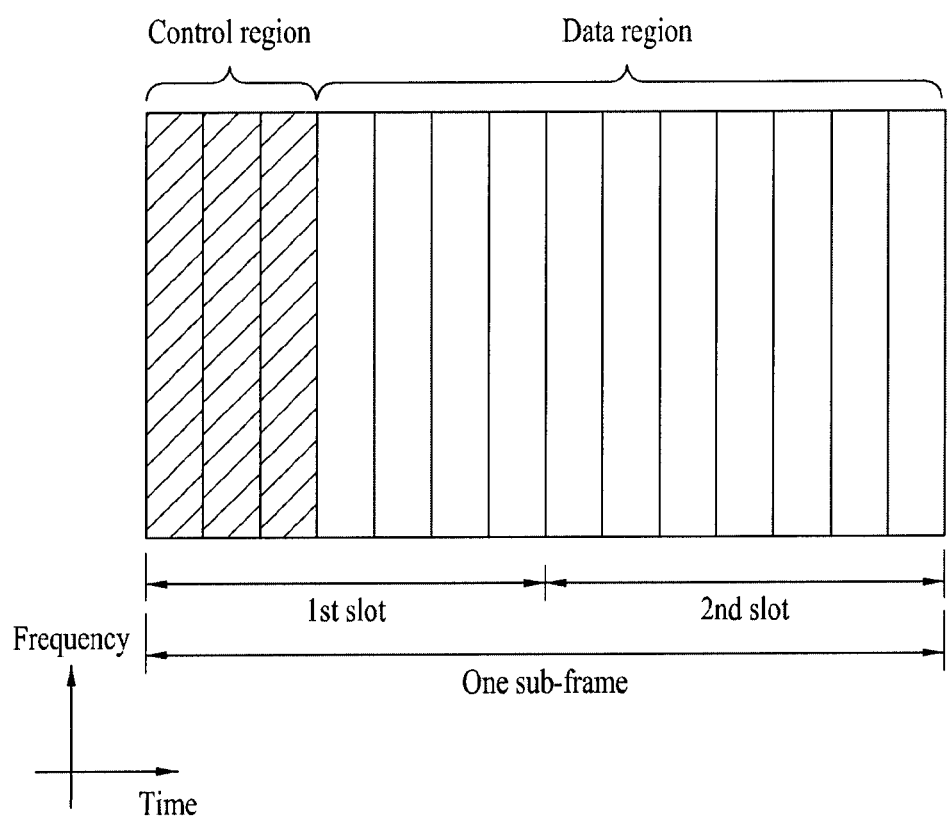
FIG. 3 exemplarily shows a downlink subframe structure.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
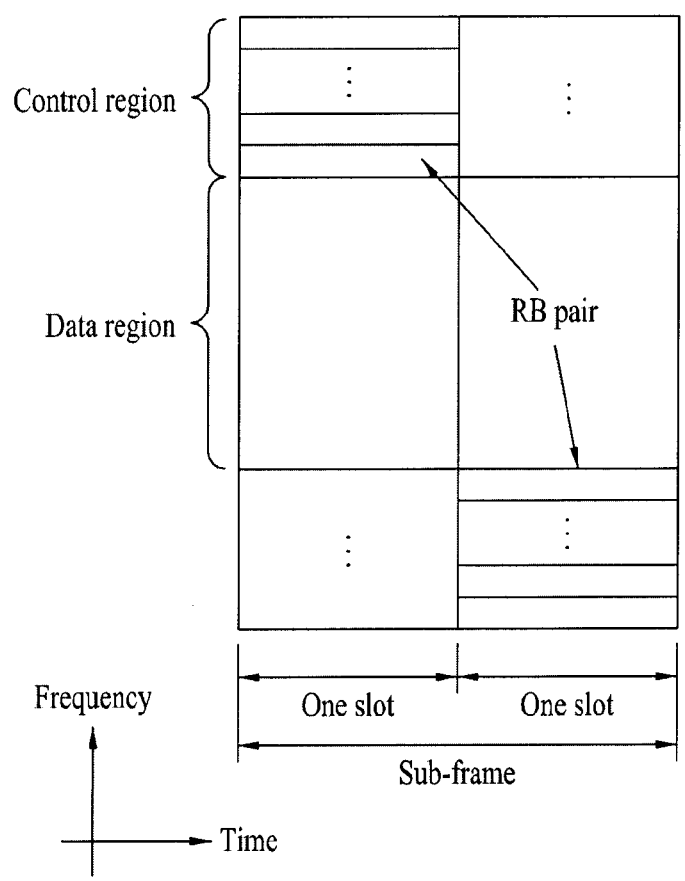
FIG. 4 exemplarily shows an uplink subframe structure.

FIG. 4 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

MIMO System Modeling

FIG. 5 illustrates the configuration of a communication system including multiple antennas.

Referring to FIG. 5(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. It is assumed that $N_T$ Tx antennas and $N_R$ Rx antennas are present.

Regarding a transmission signal, up to $N_T$ pieces of information can be transmitted through the $N_T$ Tx antennas, as expressed as the following vector.

$$s = [s_1, s_2, \ldots s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vectors $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs \quad \text{[Equation 5]}$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots, y_{N_T}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_n}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \vdots \\ h_{i2} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

[Equation 10]

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

In general, the rank of a matrix is defined as the smaller between the numbers of independent rows and columns. Accordingly, the rank of the matrix is not larger than the number of rows or columns. The rank of the matrix H, rank (H) is limited as follows.

$$\text{rank}(H) \leq \min(N_T, N_R) \quad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

In the specification, 'rank' with respect to MIMO transmission represents the number of paths through which signals can be independently transmitted in a specific frequency resource at a specific instance and 'number of layers' refers to the number of signal streams transmitted through each path. Since a transmitter transmits as many layers as the number of ranks used for signal transmission, the rank corresponds to the number of layers unless otherwise mentioned.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS. In more detail, an independent RS should be transmitted through each Tx port.

A downlink RS includes a Common RS (CRS) shared among all UEs in a cell and a Dedicated RS (DRS) for only a specific-UE. It is possible to provide information for channel estimation and demodulation using such RSs.

The reception side (UE) estimates the channel state from the CRS and feeds back an indicator associated with channel quality, such as a Channel Quality Indicator (CQI), a Precoding Matrix Index (PMI) and/or a Rank Indicator (RI), to the transmission side (eNodeB). The CRS may be also called a cell-specific RS. Alternatively, an RS associated with the feedback of Channel State Information (CSI) such as CQI/PMI/RI may be separately defined as a CSI-RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DMRS).

FIG. 6 is a diagram showing a pattern of CRSs and DRSs mapped on a downlink RB pair defined in the existing 3GPP LTE system (e.g., Release-8). The downlink RB pair as a mapping unit of the RSs may be expressed in units of one subframe on a time domain×12 subcarriers on a frequency domain. That is, on the time axis, one RB pair has a length of 14 OFDM symbols in case of the normal CP (FIG. 6(a)) and has a length of 12 OFDM symbols in case of the extended CP (FIG. 6(b)).

Figure 7:
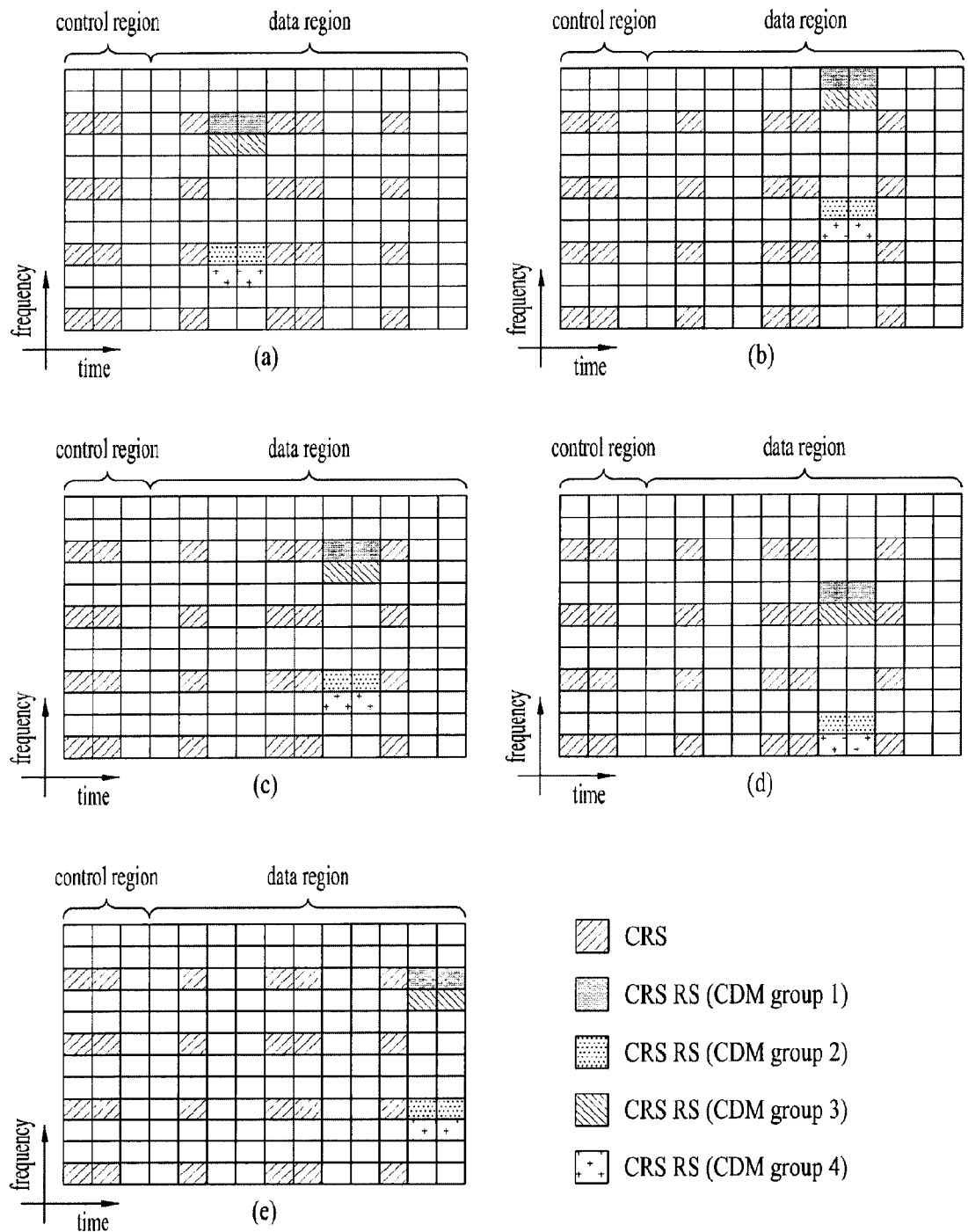
FIG. 7 is a diagram showing exemplary CSI-RS patterns.

FIG. 6 shows the locations of the RSs on the RB pair in the system in which the eNodeB supports four transmission antennas. In FIG. 7, Resource Elements (REs) denoted by "0", "1", "2" and "3" indicate the locations of the CRSs of the antenna port indexes 0, 1, 2 and 3, respectively. In FIG. 6, the RE denoted by "D" indicates the location of the DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNodeB). The 3GPP LTE (e.g., Release-8) system supports various antenna configurations, and a downlink signal transmission side (eNodeB) has three antenna configurations such as a single antenna, two transmission antennas and four transmission antennas. If the eNodeB performs single-antenna transmission, RSs for a single antenna port are arranged. If the eNodeB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNodeB performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

If multiple antennas are supported, when RSs are transmitted from a certain antenna port, the RSs are transmitted at the locations of the REs specified according to the RS pattern and any signal is not transmitted at the locations of the REs specified for another antenna port.

The rule of mapping the CRSs to the RBs is defined by Equation 12.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k denotes a subcarrier index, l denotes a symbol index, and p denotes an antenna port index. $N_{symb}^{DL}$ denotes the number of OFDM symbols of one downlink slot, $N_{RB}^{DL}$ denotes the number of RBs allocated to the downlink, $n_s$ denotes a slot index, and $N_{ID}^{cell}$ denotes a cell ID. mod indicates a modulo operation. The location of the RS in the frequency domain depends on a value $V_{shift}$. Since the value $V_{shif}$ depends on the cell ID, the location of the RS has a frequency shift value which varies according to the cell.

More specifically, in order to increase channel estimation performance through the CRSs, the locations of the CRSs in the frequency domain may be shifted so as to be changed according to the cells. For example, if the RSs are located at an interval of three subcarriers, the RSs are arranged on 3k-th subcarriers in one cell and arranged on (3k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting indicates that the RSs are transmitted using higher power by bringing (stealing) the powers of the REs except for the REs allocated for the RSs among the REs of one OFDM symbol.

In the time domain, the RSs are arranged from a symbol index (l=0) of each slot as a starting point at a constant interval. The time interval is differently defined according to the CP length. The RSs are located on symbol indexes 0 and 4 of the slot in case of the normal CP and are located on symbol indexes 0 and 3 of the slot in case of the extended CP. Only RSs for a maximum of two antenna ports are defined in one OFDM symbol. Accordingly, upon four-transmission antenna transmission, the RSs for the antenna ports 0 and 1 are located on the symbol indexes 0 and 4 (the symbol indexes 0 and 3 in case of the extended CP) of the slot and the RSs for the antenna ports 2 and 3 are located on the symbol index 1 of the slot. The frequency locations of the RSs for the antenna ports 2 and 3 in the frequency domain are exchanged with each other in a second slot.

Hereinafter, the DRS will be described in detail.

The DRS (or the UE-specific RS) is used to demodulate data. A precoding weight used for a specific UE upon multi-antenna transmission is also used in an RS without change so as to estimate an equivalent channel, in which a transfer channel and the precoding weight transmitted from each transmission antenna are combined, when the UE receives the RSs.

The existing 3GPP LTE system (e.g., Release-8) supports four-transmission antenna transmission as a maximum and the DRS for Rank 1 beamforming is defined. The DRS for Rank 1 beamforming is also denoted by the RS for the antenna port index 5. The rule of the DRS mapped on the RBs is defined by Equations 13 and 14. Equation 13 is for the normal CP and Equation 14 is for the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k denotes a subcarrier index, l denotes a symbol index, and p denotes an antenna port index. $N_{SC}^{RB}$ denotes the resource block size in the frequency domain and is expressed by the number of subcarriers. $n_{PRB}$ denotes a physical resource block number. $N_{RB}^{PDSCH}$ denotes the bandwidth of the RB of the PDSCH transmission. $n_s$ denotes a slot index, and $N_{ID}^{cell}$ denotes a cell ID. mod indicates a modulo operation. The location of the RS in the frequency domain depends on a value $V_{shift}$. Since the value $V_{shif}$ depends on the cell ID, the location of the RS has a frequency shift value which varies according to the cell.

In order to support spectral efficiency higher than that of the existing 3GPP LTE (e.g., Release-8) system, a system (e.g., an LTE-A system) having the extended antenna configuration may be designed. The extended antenna configuration may have, for example, eight transmission antennas. In the system having the extended antenna configuration, UEs which operate in the existing antenna configuration needs to be supported, that is, backward compatibility needs to be supported. Accordingly, it is necessary to support a RS pattern according to the existing antenna configuration and to design a new RS pattern for an additional antenna configuration.

Downlink RSs in LTE have been defined only for up to 4 antenna ports. Therefore, when an LTE-A system has 4 to 8 downlink transmit antennas, there is a need to additionally define RSs for the antenna ports in the LTE-A system. Both an RS for channel measurement and an RS for data demodulation need to be taken into consideration as RSs for up to 8 transmit (Tx) antenna ports.

If RSs for up to 8 transmit antennas are added to time-frequency domains in which a CRS defined in the LTE standard is transmitted every subframe over an entire band, RS overhead is excessively increased from the viewpoint of RS transmission. Therefore, RS overhead reduction should be considered when designing a new RS of a maximum of 8 antenna ports.

RSs newly introduced in the LTE-A system may be largely classified into two types. One is a Channel State Information RS (CSI-RS) which is an RS for channel measurement for calculation/selection of an RI, a Precoding Matrix Index (PMI), a CQI, or the like. The other is a DeModulation RS (DM RS) (or UE-specific RS) which is an RS for demodulating data transmitted through up to 8 transmit antennas.

CSI-RS for channel measurement is characterized in that the CSI-RS is designed mainly for channel measurement unlike the CRS of the conventional LTE system which is used not only for measurement of handover or the like but also for data modulation. Of course, the CSI-RS may also be used for measurement of handover or the like. Since the CSI-RS is transmitted only for the purpose of obtaining information regarding channel conditions, the CSI-RS need not be transmitted every subframe, unlike the CRS of the conventional LTE system. Accordingly, to reduce CSI-RS overhead, the CSI-RS may be designed to be transmitted intermittently (periodically) in the time axis.

FIG. 7 is a diagram showing exemplary CSI-RS patterns. In more detail, in case of one RB pair (in case of a normal CP, 14 OFDM symbols in a time domain×12 subcarriers in a frequency domain) used for DL data transmission, FIG. 7 shows the locations of resource elements (REs) used for CSI-RS transmission. One CSI-RS pattern shown in FIGS. 7(*a*) to 7(*e*) may be used in a certain DL subframe. CSI-RS may be transmitted to 8 antenna ports (Antenna Port Indexes #15 to #22) additionally defined in the LTE-A system. CSI-RSs for different antenna ports are located at different frequency resources (subcarriers) and/or different time resources (OFDM symbols), such that each CSI-RS cam be identified. That is, CSI-RSs may be multiplexed according to the FDM and/or TDM scheme(s). In addition, CSI-RSs of different antenna ports located at the same time-frequency resources may be identified from each other by different orthogonal codes (that is, the CSI-RSs may be multiplexed according to the CDM scheme). As can be seen from FIG. 7(*a*), CSI-RSs of Antenna Ports #15 and #16 may be located at REs denoted by CSI-RS CDM Group #1, and may be multiplexed by orthogonal codes. CSI-RSs of Antenna Ports #17 and #18 may be located at REs denoted by CSI-RS CDM Group #2 as shown in FIG. 7(*a*), and may be multiplexed by orthogonal codes. In FIG. 7(*a*), CSI-RSs of Antenna Ports #19 and #20 may be located at REs denoted by CSI-RS CDM Group #3, and may be multiplexed by orthogonal codes. CSI-RSs of Antenna Ports #21 and #22 may be located at REs denoted by CSI-RS CDM Group #4 as shown in FIG. 7(*a*), and may be multiplexed by orthogonal codes. The same principles described in FIG. 7(*a*) may be applied to FIGS. 7(*b*) to 7(*e*).

As described above, when data is transmitted in a certain DL subframe, (dedicated) DM RS is transmitted to a UE in which data transmission is scheduled. DM RS dedicated for a specific UE may be designed only in a resource region (a time-frequency domain in which data of the corresponding UE is transmitted) in which the corresponding UE is scheduled. In LTE-A, a high-order MIMO, multi-cell transmission, and evolved MU-MIMO, etc. have been considered. To support the efficient RS management and the evolved Tx scheme, DM RS—based data modulation has been considered in LTE-A. That is, unlike DMRS (Antenna Port Index #5) (See FIG. 6(*d*)) for Rank #1 beamforming defined in legacy 3GPP LTE (e.g., Release-8), DMRS for two or more layers may be defined to support data transmission through additional antennas.

Figure 8:
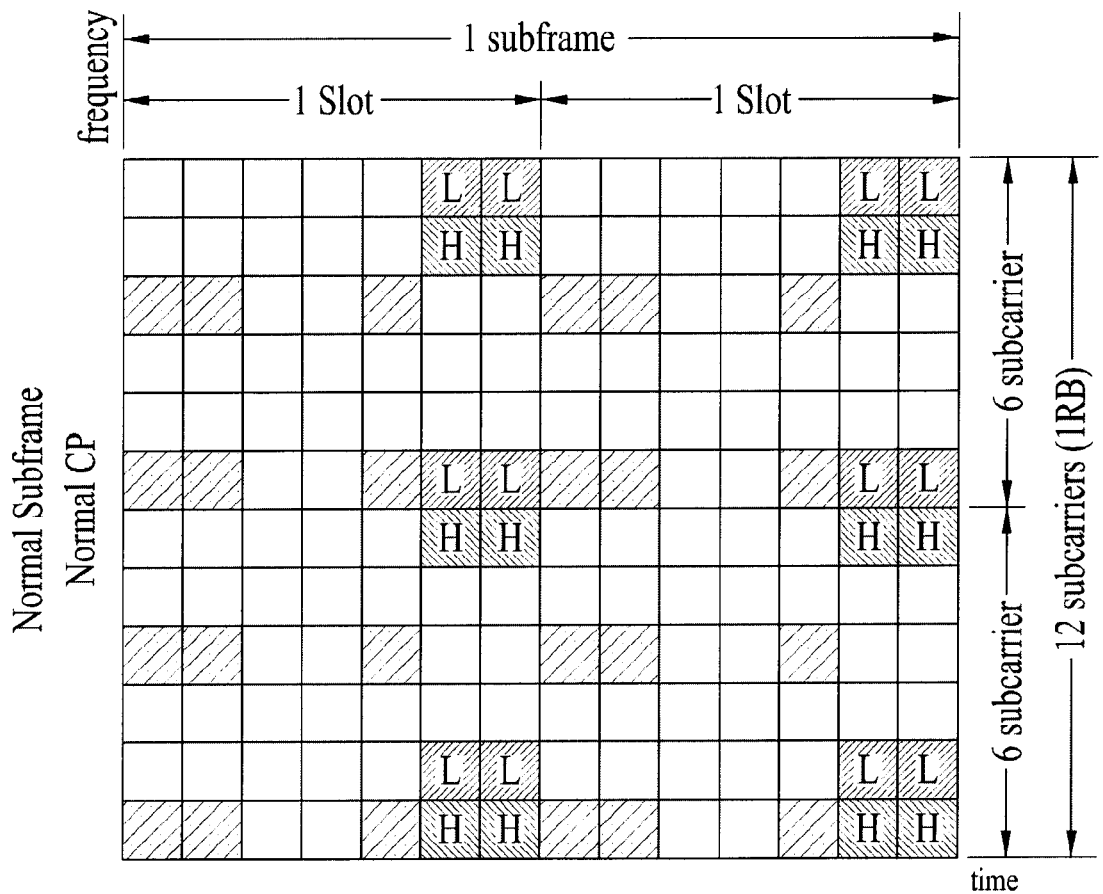
FIG. 8 is a diagram showing exemplary DMRS patterns.

FIG. 8 is a diagram showing exemplary DMRS patterns defined in LTE-A. In FIG. 8, DMRS patterns may indicate RE positions to which DMRS is mapped within one RB pair (=14 OFDM symbols×12 subcarriers) of a normal CP subframe.

Referring to FIG. 8, if Rank of PDSCH is set to 1 or 2, a total of 12 REs (each of which is denoted by 'L' in FIG. 8) of one RB pair may be used for DMRS transmission. DMRS of Layer #1 and DMRS of Layer #2 may be CDM-processed by orthogonal codes corresponding to 'Spreading Factor=2'. In more detail, DMRS of Layer #1 and DMRS of Layer #2 may be spread on a time axis, and a total of 4 REs is used for DMRS transmission on a single subcarrier, such that DMRSs for Layers #1 and #2 are repeated at a slot boundary. That is, DMRS for Layer #1 and DMRS for Layer #2 are mapped to the same RE, and DMRS for Layer #1 and DMRS for Layer #2 may be distinguished from each other by an orthogonal code (OC) multiplied by a time domain (covering OFDM symbols).

Referring to FIG. 8, if Rank of PDSCH is set to 3 or higher, 12 REs (each of which is denoted by 'H' in FIG. 7) are additionally used for DMRS transmission. DMRS for Layer #3 and DMRS for Layer #4 may be FDM-processed with DMRSs for Layers #1 and #2. That is, subcarriers to which DMRSs for Layers #3 and #4 are mapped are different from subcarriers to which Layers #1 and #2 are mapped. In addition, DMRS for Layer #3 and DMRS for Layer #4 may be CDM-processed by an orthogonal code (OC) corresponding to 'Spreading Factor=2' in a time domain.

In case of 'Rank=5 or higher', additional REs other than REs used for 'Rank=1, 2, 3, or 4' are not used for DMRSs of Layers #5, #6, #7, and #8. However, REs to which DMRSs of Layers #1, #2, #3, and #4 are mapped may be reused, and OC having 'Spreading Factor=4' is multiplied by DMRSs for Layers #5, #6, #7, and #8 on a time axis, such that the DMRSs for Layers #5, #6, #7, and #8 may be distinguished from DMRSs for Layers #1, #2, #3, and #4 according to the CDM scheme. For example, DMRSs for Layers #5 and #7 may be mapped to REs identical to REs (each of which is denoted by 'L' in FIG. 8) to which DMRSs for Layers #1 and #2 are mapped, and DMRSs for Layers #6 and #8 may be mapped to REs identical to REs (each of which is denoted by 'H' in FIG. 8) to which DMRSs for Layers #3 and #4 are mapped. In this case, DMRSs for Layers #1, #2, #5, and #7 may be identified from each other in the time domain according to the CDM scheme, and DMRSs for Layers #3, #4, #6, and #8 may be identified from each other in the time domain according to the CDM scheme. DMRSs for Layers #1, #2, #5, and #7 may also be distinguished from DMRSs for Layers #3, #4, #6, and #8 according to the FDM scheme.

For example, DMRS for Layer #1 may be spread on orthogonal codes [+1+1+1+1] corresponding to 'Spreading Factor=4' on four REs of a single subcarrier. In order to maintain orthogonality with DMRS for Layer #1, DMRS for Layer #5 may be spread on orthogonal codes [+1+1−1−1] corresponding to 'Spreading Factor=4'. In other words, orthogonal codes applied to DMRSs for Layers #5, #6, #7, and #8 are designed to use the same REs as in DMRSs for Layers #1, #2, #3, and #4 as well as to maintain orthogonality, and codes (obtained by phase inversion) adjusted to make a phase difference of 180° at a slot boundary (between a first slot and a second slot) may be used under the condition that OC of 'Spreading Factor=2' is used.

The following Table 1 shows spreading codes applied to the above-mentioned DMRS patterns.

TABLE 1

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In Table 1, Antenna Ports (p) #7 to #14 may respectively indicate logical antennas (i.e., antenna ports) through which DMRSs for PDSCH Tx layers #1 to #8 are transmitted. DMRSs for Antenna Ports #7, #8, #11, and #13 may be mapped to the same 12 REs (each of which is denoted by 'L' in FIG. 8), and DMRSs for Antenna Ports #9, #10, #12, and #14 may be mapped to the same 12 REs (each of which is denoted by 'H' in FIG. 8).

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs. That is, the scheduler can directly direct collaborative MIMO operation to each eNB.

As described above, the CoMP system can be regarded as a virtual MIMO system using a group of a plurality of cells. Basically, a communication scheme of MIMO using multiple antennas can be applied to CoMP.

Downlink Channel State Information (CSI) Feedback

MIMO can be categorized into an open-loop scheme and a closed-loop scheme. The open-loop scheme performs MIMO transmission at a transmitter without feedback of CSI from a MIMO receiver, whereas the closed-loop scheme performs MIMO transmission at the transmitter using feedback of CSI from the MIMO receiver. In closed-loop MIMO, each of the transmitter and the receiver can perform beamforming based on CSI to obtain MIMO Tx antenna multiplexing gain. The transmitter (e.g. eNB) can allocate an uplink control channel or an uplink shared channel to the receiver (e.g. UE) such that the receiver can feed back CSI.

CSI fed back may include a rank indicator (RI), a precoding matrix index (PMI) and a channel quality indictor (CQI).

The RI indicates information about a channel rank. The channel rank represents a maximum number of layers (or streams) through which different pieces of information can be transmitted through the same time-frequency resource. The RI is determined by long term fading of a channel, and thus the RI can be fed back to an eNB at a longer period than the PMI and CQI.

The PMI is information about a precoding matrix used for transmission from a transmitter and is a value in which spatial characteristics of a channel are reflected. Precoding refers to mapping a transport layer to a transmit antenna. A layer-to-antenna mapping relation can be determined by a precoding matrix. The PMI indicates a precoding matrix index of an eNB preferred by a UE based on a metric such as signal-interference plus noise ratio (SINR). To reduce feedback overhead of precoding information, the transmitter and receiver can share a codebook including precoding matrices and only an index indicating a specific precoding matrix in the codebook can be fed back.

The CQI indicates channel quality or channel intensity. The CQI can be represented as a predetermined MCS combination. That is, a fed back CQI index indicates a corresponding modulation scheme and a code rate. The CQI represents a value in which a reception SINR that can be obtained when an eNB configures a spatial channel using the PMI is reflected.

In a system supporting an extended antenna configuration (e.g. LTE-A), additional multi-user diversity is obtained using multi-user MIMO (MU-MIMO). When an eNB performs downlink transmission using CSI fed back by one of multiple UEs, it is necessary to prevent downlink transmission from interfering with other UEs since an interference channel is present between UEs multiplexed in the antenna domain in MU-MIMO. Accordingly, MU-MIMO requires more accurate CSI feedback than single user MIMO (SU-MIMO).

A new CSI feedback scheme that improves CSI composed of the RI, PMI and CQI can be applied in order to measure and report more accurate CSI. For example, precoding information fed back by a receiver can be indicated by a combination of two PMIs. One (first PMI) of the two PMIs is long term and/or wideband information and may be denoted as W1. The other PMI (second PMI) is short term and/or subband information and may be denoted as W1. A final PMI can be determined by a combination (or function) of W1 and W2. For example, if the final PMI is W, W can be defined as W=W1*W2 or W=W2*W1.

Here, W1 reflects frequency and/or temporal average characteristics of a channel. In other words, W1 can be defined as CSI reflecting characteristics of a long-term channel in the time domain, characteristics of a wideband channel in the frequency domain or characteristics of a long-term and wideband channel. To simply represent these characteristics of W1, W1 is referred to as long term wideband CSI (or long term wideband PMI) in this specification.

W2 reflects instantaneous channel characteristics compared to W1. In other words, W2 can be defined as CSI reflecting characteristics of a short-term channel in the time domain, characteristics of a subband channel in the frequency domain or characteristics of a short-term and subband channel. To simply represent these characteristics of W2, W2 is referred to as short term subband CSI (or short term subband PMI) in this specification.

To determine a final precoding matrix W from two different pieces of information (e.g. W1 and W2) representing channel states, it is necessary to configure separate codebooks (i.e. a first codebook for W1 and a second codebook for W2) composed of precoding matrices representing the information. A codebook configured in this manner may be called a hierarchical codebook. Determination of a final codebook using the hierarchical codebook is called hierarchical codebook transformation.

A codebook can be transformed using a long-term covariance matrix of a channel, represented by Equation 15, as exemplary hierarchical codebook transformation.

$$W = \text{norm}(W1 W2) \quad \text{[Equation 15]}$$

In Equation 15, W1 (long term wideband PMI) denotes an element (i.e. codeword) constituting a codebook (e.g. first codebook) generated to reflect long term wideband channel information. That is, W1 corresponds to a precoding matrix included in the first codebook that reflects the long term wideband channel information. W2 (short term subband PMI) represents a codeword constituting a codebook (e.g. second codebook) generated to reflect short term/subband channel information. That is, W2 corresponds to a precoding matrix included in the second codebook that reflects the short term subband channel information. W is a codeword of a transformed final codebook and norm(A) denotes a matrix in which the norm of each column of matrix A is normalized to 1.

W1 and W2 may have structures as represented by Equation 16.

$$W1(i) = \begin{bmatrix} X_i & 0 \\ 0 & X_i \end{bmatrix} \quad \text{[Equation 16]}$$

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r \text{ columns}} \text{ (if rank} = r)$$

In Equation 16, W1 can be defined as a block diagonal matrix and blocks correspond to the same matrix $X_i$. A block $X_i$ can be defined as a (Nt/2)×M matrix. Here, Nt denotes the number of Tx antennas. $e_M^p$ (p=k, l, ..., m) is an M×1 vector wherein a p-th element of M vector elements represents 1 and other elements represent 0. When W1 is multiplied by $e_M^p$, a p-th column is selected from columns of W1 and thus this vector can be called a selection vector. The number of vectors fed back at a time to represent a long term wideband channel increases as M increases, to thereby improve feedback accuracy. However, the codebook size of W1 fed back with low frequency decreases and the codebook size of W2 fed back with high frequency increases as M increases, increasing feedback overhead. That is, there is a tradeoff between feedback overhead and feedback accuracy. Accordingly, M can be determined such that feedback overhead is not excessively increased and appropriate feedback accuracy is maintained. As to W2, $\alpha_j$, $\beta_j$ and are predetermined phase values. In Equation 16, $1 \le k, l, m \le M$ and k, l and m are integers.

The codebook structure represented by Equation 16 uses a cross polarized antenna configuration and reflects correlation characteristics of a channel, generated when antenna spacing is narrow (when a distance between neighboring antennas is less than half a signal wavelength). For example, cross polarized antenna configurations may be represented as shown in Table 2.

TABLE 2

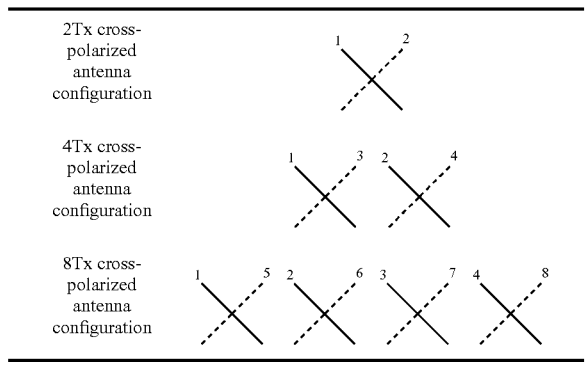

| 2Tx cross-polarized antenna configuration | |
| 4Tx cross-polarized antenna configuration | |
| 8Tx cross-polarized antenna configuration | |

In Table 2, an 8Tx cross polarized antenna configuration is composed of two antenna groups having orthogonal polarizations. Antennas belonging to antenna group 1 (antennas 1, 2, 3 and 4) may have the same polarization (e.g. vertical polarization) and antennas belonging to antenna group 2 (antennas 5, 6 7 and 8) may have the same polarization (e.g. horizontal polarization). The two antenna groups are co-located. For example, antennas 1 and 5 can be co-located, antennas 2 and 6 can be co-located, antennas 3 and 7 can be co-located and antennas 4 and 8 can be co-located. In other words, antennas in an antenna group have the same polarization as in a uniform linear array (ULA) and a correlation between antennas in an antenna group has a linear phase increment characteristic. Furthermore, a correlation between antenna groups has a phase rotation characteristic.

Since a codebook is composed of values obtained by quantizing a channel, it is necessary to design the codebook by reflecting actual channel characteristics therein. To describe reflection of actual channel characteristics in codewords of a codebook designed as represented by Equation 16, a rank-1 codebook is exemplified. Equation 17 represents determination of a final codeword W by multiplying codeword W1 by codeword W2 in the case of rank 1.

$$W1(i) * W2(j) = \begin{bmatrix} X_i(k) \\ \alpha_j X_i(k) \end{bmatrix}$$ [Equation 17]

In Equation 17, the final codeword is represented by a vector of Nt×1 and is composed of an upper vector $X_i(k)$ and a lower vector $\alpha_j X_i(k)$ which respectively represent correlations between horizontal antenna groups and vertical antenna groups of cross polarized antennas. $X_i(k)$ is preferably represented as a vector (e.g. DFT matrix) having linear phase increment in which correlation between antennas in each antenna group is reflected.

When the above-described codebook is used, higher channel feedback accuracy can be achieved compared to a case in which a single codebook is used. Single-cell MU-MIMO can be performed using high accuracy channel feedback and thus high accuracy channel feedback is necessary for CoMP operation. For example, plural eNBs cooperatively transmit the same data to a specific UE in CoMP JT operation, and thus this system can be theoretically regarded as a MIMO system in which plural antennas are geographically distributed. That is, even when MU-MIMO operation is performed in CoMP JT, high channel information accuracy is necessary to avoid interference between co-scheduled UEs. In addition, CoMP CB also requires accurate channel information in order to avoid interference of a neighboring cell, applied to a serving cell.

Radio Link Monitoring (RLM)

The UE may monitor a DL radio link quality of a serving cell (i.e., a primary serving cell used when multiple serving cells are configured), and may inform a higher layer of the corresponding link status. If a link quality measured by a lower layer (e.g., a physical layer) is less than a predetermined threshold value (e.g., $Q_{out}$), "out-of-sync" indication may be provided to a higher layer. Conversely, if the link quality is higher than a predetermined threshold (e.g., $Q_{in}$), "in-sync" indication may be transferred from a lower layer to a higher layer. Radio Link Quality may be determined according to whether the PDCCH decoding error probability (e.g., Block Error Rate (BLER) or Signal-to-Interference plus Noise Ratio (SINR)) satisfies a predetermined reference. If the measured link quality continuously stays in a predetermined reference or less during a predetermined time, it becomes more difficult to maintain connection to the serving cell any longer, such that Radio Link Failure (RLF) may be declared.

As described above, RLM may be based on a link quality estimated on the basis of the PDCCH decoding error probability. Meanwhile, the evolved wireless communication system has proposed various methods for improving PDCCH performance. If the legacy RLM is carried out even when a new PDCCH Tx/Rx technique is used, the PDCCH decoding error probability is wrongly estimated so that the actual rank quality may not be incorrectly monitored. Accordingly, there is a need to modify the RLM technique in consideration of a new PDCCH Tx/Rx scheme. The present invention proposes various methods for correctly and efficiently performing RLM in consideration of a new PDCCH Tx/Rx method.

UE-Specific RS Based PDCCH

Only the open-loop Tx diversity is defined in the legacy wireless communication system such that the open-loop Tx diversity is defined as a MIMO Tx technique applicable to PDCCH. According to the open-loop Tx diversity scheme, the precoding matrix (i.e., the mapping relationship between a layer and an antenna port) is predetermined without feedback from the reception end, so that it is impossible to perform the precoding operation appropriate for a changed channel state.

On the other hand, a method for employing a UE-specific RS for PDCCH has been discussed in the evolved wireless communication system. The UE-specific RS is an RS transmitted only to each UE. In addition, precoding is applied to the UE-specific RS, and the same precoding may also be applied to data transmission. The precoding matrix applied to UE-specific RS and data transmission may also be determined within a set (or codebook) of predefined precoding matrices. Therefore, the channel estimated on the basis of UE-specific RS by the reception end (i.e., receiver) may correspond to a channel to which precoding is applied. If data demodulation is carried out using the channel estimation, there is no need to indicate additional precoding information (e.g., specific information (or Tx PMI) indicating which one of precoding matrices is used within the predefined codebook) for data demodulation. In other words, when channel estimation is performed on the basis of UE-specific RS and data is demodulated on the basis of the estimated channel, it is obvious (transparent) to the UE that which precoding was applied to UE-specific RS and data. That is, when PDCCH is transmitted using the UE-specific RS, there is no need to perform signaling of precoding information, and the base station (BS) can apply the precoding operation appropriate for a channel situation to a PDCCH. For example, PDCCH performance of a low-mobility UE capable of performing a high CSI feedback can be more improved. That is, the BS determines the precoding appropriate for a channel state fed back from the UE, such that the determined precoding may be applied to PDCCH and UE-specific RS. This precoding may be optimal for a channel state obtained from a PDCCH reception time of the UE under the condition that there is a low channel state variation, so that UE performance for demodulating a PDCCH on the basis of a channel estimated using the UE-specific RS can be improved.

In case of using the above-mentioned UE-specific RS based PDCCH, a structure more appropriately modified than the legacy channel structure may be used. For example, a data region (i.e., the remaining OFDM symbol regions other than some initial OFDM symbols within one subframe) other than a control region for use in the legacy DL subframe structure shown in FIG. 3 may be used for transmission of a new PDCCH. In order to distinguish a new PDCCH from the legacy PDCCH, the new PDCCH may also be referred to as Enhanced-PDCCH (E-PDCCH).

Figure 9:
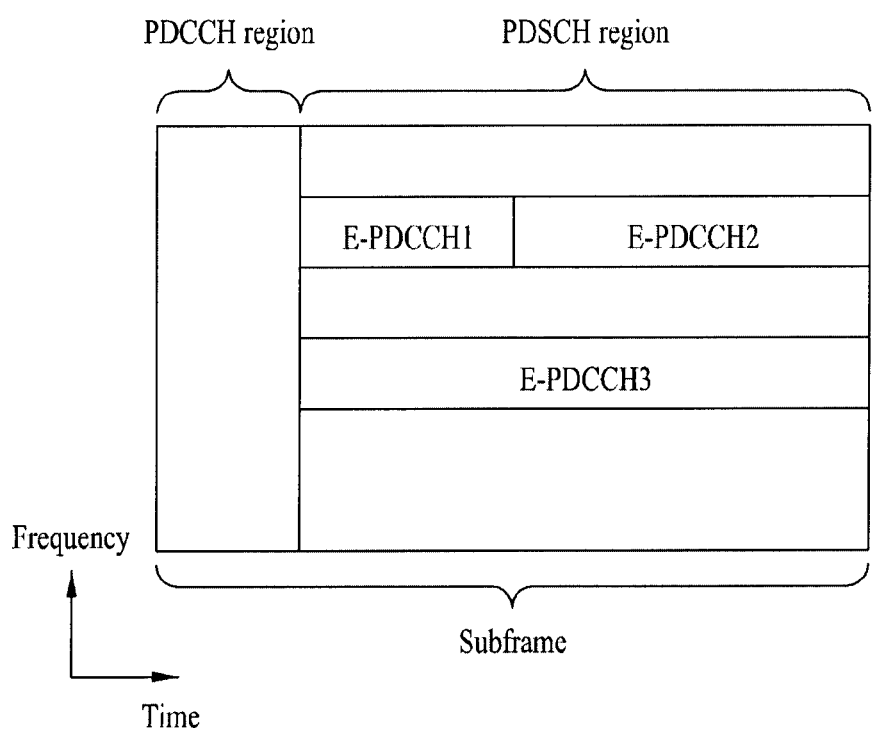
FIG. 9 is a diagram showing exemplary E-PDCCH structures.

FIG. 9 is a diagram showing exemplary E-PDCCH structures. As can be seen from FIG. 9, a time domain (e.g., slots or OFDM symbols) to be transmitted may be differently configured according to E-PDCCH types. For example, E-PDCCH1 may be E-PDCCH carrying DCI related to DL assignment, and may be mapped to a region corresponding to a first slot from among the PDSCH region as shown in FIG. 9. E-PDCCH2 may be defined as E-PDCCH carrying DCI related to UL grant. As shown in FIG. 9, E-PDCCH1 may be mapped to a region corresponding to a second slot from among the PDSCH region. Alternatively, E-PDCCH3 may be a specific E-PDCCH capable of being mapped to two slots of the PDSCH region without distinction between DL assignment and UL grant. Types and/or resource locations of the above E-PDCCH are disclosed for illustrative purposes only, and the scope or spirit of the present invention is not limited thereto.

On the contrary, a link quality of RLM may be determined on the basis of the PDCCH decoding error probability. If the link quality is estimated on the basis of E-PDCCH (specifically, UE-specific RS based E-PDCCH), precoding to be applied to E-PDCCH must be reflected to accurately perform RLM. However, according to the above UE-specific RS based E-PDCCH, UE-specific RS and E-PDCCH are equally precoded, and specific information indicating which precoding was applied is transparent or apparent to the UE. That is, it is impossible for the UE to recognize which precoding was applied to E-PDCCH. In this case, there may arise obscurity in decoding the E-PDCCH decoding probability for RLM.

Various examples capable of correctly and efficiently performing RLM depending upon the UE-specific RS based E-PDCCH while simultaneously removing such ambiguity will hereinafter be described in detail. The control channel (e.g., UE-specific RS based E-PDCCH or other control channels) precoded on the basis of the precoding information unknown to the UE will hereinafter be referred to as "precoding-based control channel". That is, the following examples may correspond to various methods for correctly and efficiently performing the RLM based on the precoding-based control channel.

Embodiment 1

The following embodiments relate to methods for deciding precoding information of the precoding-based control channel by the receiver (e.g., UE) of the precoding-based control channel.

Embodiment 1-1

When RLM of the precoding-based control channel is performed, it is assumed that a specific precoding matrix is applied to the precoding-based control channel, such that the present invention proposes a method for estimating a link quality on the basis of this assumption. For example, it is assumed that the UE can recognize which precoding matrix is applied to UE-specific RS and/or precoding-based control channel by recognizing a channel status, etc. estimated from other reference signals (RSs), such that the UE can perform RLM of the precoding-based control channel.

For example, the UE can derive precoding information to be used for RLM of the precoding-based control channel from CSI-RS. As described above, the UE informs the UE of CSI-RS configuration, and transmits CSI-RS. The UE selects a preferred precoding matrix on the basis of CSI_RS, and feeds back the selected precoding matrix to the BS. In accordance with the present invention, the UE estimates a channel using CSI-RS, and selects a PMI optimal for the estimated channel status, such that the UE may operate to estimate a link quality based on the assumption that the corresponding PMI is used. In this case, the optimum PMI may correspond to a first preferred precoding matrix (in which the highest SINR is expected) in a current channel status within a predetermined codebook (i.e., a set of precoding matrices) according to a predetermined rank value supported by DL transmission. Alternatively, the present invention does not limit the scope of UE assumption in which the UE always selects a first preferred precoding matrix within the codebook, and a link quality can be estimated on the assumption that a second or third preferred precoding matrix is selected. As a result, the present invention can provide the degree of freedom to precoding matrix selection of the BS. If the UE feeds back precoding information to the BS, the BS may determine the precoding operation to be actually applied in consideration of feedback information received from the UE although the BS is not limited to the feedback information from the UE. If the number of precoding matrices capable of being assumed for link quality estimation of the UE increases, the range of selectable candidates is increased even when the BS performs actual precoding so that the degree of freedom increases in precoding application.

Meanwhile, the UE for use in the legacy wireless communication system may calculate/decide CSI on the assumption of DL data (e.g., PDSCH) transmission, and report the calculated/decided CSI. However, CSI reporting on the assumption of transmission of a new control channel (e.g., E-PDCCH) is not defined. In this case, if the UE is configured to report a PMI to the BS as a CSI feedback of PDSCH, the UE can estimate a link quality on the assumption that the precoding matrix corresponding to the reported PMI is used for E-PDCCH transmission.

In addition, Transmit Rank of E-PDCCH may be limited. For example, although the wireless communication system supports up to Rank #8 for DL data transmission, only a lower rank (e.g., Rank 1 or 2) may be supported for E-PDCCH transmission. Therefore, when the UE selects a PMI on the assumption of link quality calculation through E-PDCCH, the PMI may be selected within the limited rank only. In more detail, when the UE estimates the E-PDCCH decoding error probability using a PMI (i.e., PMI on the assumption of PDSCH transmission) reported to the BS, it is assumed that PMI of 'Rank=2 or higher' is reported for PDSCH and transmission rank of the E-PDCCH is limited to '1'. In this case, assuming that each of multiple column vectors of the precoding matrix corresponding to the reported PMI is used for E-PDCCH at the same probability, the UE can estimate the E-PDCCH decoding error probability.

On the contrary, the UE may obtain precoding information to be used for RLM of the precoding-based control channel using CRS instead of CSI-RS. For example, if the BS does not configure CSI-RS or if the number of antenna ports configured in CSI-RS is equal to or less than a predetermined number, it may be difficult to assume precoding information applied to the precoding-based control channel using CSI-RS. In this case, assuming that the UE selects a precoding matrix appropriate for a channel state through CRS and the BS uses the corresponding precoding matrix, the decoding error probability (i.e., link quality) of E-PDCCH can be estimated.

In accordance with the CRS scheme, the same frequency band is used for UL and DL as in the TDD system, such that the CRS scheme may be efficiently used in the case in which there is a high similarity between UL and DL channels. If the UL channel state is similar to the DL channel state, the BS estimates the UL channel from a sounding reference signal (SRS) transmitted to UL and also estimates the DL channel from UL channel estimation. The UE decides precoding appropriate for a DL channel state derived through SRS by the BS, and assumes that the decided precoding will be applied to DL transmission. Here, the BS can perform DL channel estimation without additional CSI-RS configuration, such that the operation for estimating the decoding error probability of the precoding-based control channel using CRS may be helpful to overhead reduction of a reference signal.

In addition, the UE can expect that precoding applied to UL transmission will be applied to DL transmission from the BS. Accordingly, the UE may assume precoding information to be applied to the precoding-based control channel in consideration of not only the DL channel state estimated from CRS but also the UL channel state. For example, the UE supporting UL MIMO transmission may receive the number of layers and precoding information related to UL transmission through UL scheduling information from the BS. If UL and DL are similar to each other, there is a high probability that UL precoding information will be applied to DL transmission. Accordingly, when the UE assumes precoding information to be applied to a precoding-based control channel, the UE simultaneously considers a DL channel state estimated through CRS and precoding information of the UL channel, such that the UE can assume precoding information more approximate to actual application precoding information. Of course, if there is a high likelihood between UL and DL on the assumption of precoding information applied to the precoding-based control channel through CSI-RS, precoding information applied to UL is also considered so that the accuracy of precoding assumption can be improved. Accordingly, RLM based on precoding information assumption can be correctly carried out.

Embodiment 1-2

When RLM for the precoding-based control channel is performed, the UE assumes that the precoding matrix applied to the precoding-based control channel is randomly selected within the codebook so that a link quality is estimated on the basis of this assumption.

In this case, the codebook considered by the UE may correspond to a transmit (Tx) rank of the precoding-based control channel. For example, assuming that E-PDCCH is transmitted only to Rank #1, the UE assumes that one of precoding vectors contained in a Rank-1 codebook predefined for PMI reporting is randomly selected (e.g., with a uniform or same probability) and the selected precoding vector is applied to E-PDCCH transmission, such that the E-PDCCH decoding error probability is decided for RLM execution.

This embodiment 1-2 may be more efficiently used for the case in which the precoding-based control channel is optimal for a specific UE. For example, if a common search space in which system information is transmitted to multiple UEs is configured in the E-PDCCH region, precoding appropriate for reception of multiple UEs should be applied so that it is difficult for the optimum precoding to be applied to a specific UE. In this case, assuming that the precoding matrix applied to E-PDCCH is selected from the codebook, the UE can perform RLM.

When the UE assumes an arbitrary precoding matrix of the codebook so as to perform RLM through the precoding-based control channel, resources through which the precoding-based control channel is transmitted may be considered. For example, the UE can assume that one arbitrary precoding matrix can be applied to total resources used for E-PDCCH transmission. Alternatively, when one E-PDCCH is transmitted through several resource blocks (e.g., multiple PRBs), one precoding matrix is applied to each resource block, and the UE can assume that precoding matrices applied to individual resource blocks are different from each other. For Tx diversity, when one E-PDCCH is transmitted over several resource blocks, the precoding matrix applied to one RB is not used for the most adjacent RB or another precoding matrix orthogonal to the precoding matrix applied to one RB may be used for the most adjacent RB. To provide Tx diversity within one RB, the UE can assume that the precoding matrix is randomly applied to each REG (Resource Element Group) or each RE of one RB constructing one E-PDCCH. The UE estimates the decoding error probability of the precoding-based control channel on the assumption of precoding applied to the precoding-based control channel, such that the UE can perform RLM. In addition, E-PDCCH (specifically, in case of a common search space) precoding can be actually applied to the BS in the same manner as in the above assumption.

Embodiment 1-3

When RLM for the precoding-based control channel is performed, the UE assumes that a specific precoding matrix is applied to the precoding-based control channel so that a link quality is estimated on the basis of this assumption.

For example, the UE assumes that the BS transmits E-PDCCH using the precoding vector $[1\ 1\ 1\ \ldots\ 1]^T$ and estimates the E-PDCCH decoding error probability, such that the UE can perform RLM. Here, the number of precoding vector elements assumed by the UE may be identical to the number of CRS or CSI-RS antenna ports configured by the BS. The above-mentioned example may be applied to 'E-PDCCH transmit (Tx) rank=1', and may be used irrespective of the actual Tx rank of E-PDCCH. Alternatively, one precoding vector is pre-assigned to each Tx rank supported for E-PDCCH, and RLM may be carried out using the precoding vector.

In another example, it is assumed that precoding applied to the precoding-based control channel is carried out using the Space-Time Code (STC) scheme denoted by Equation 18, so that RLM is carried out on the basis of this assumption.

$$\begin{cases} \text{Signal on } RE(2n) = [S(2n) \text{ from antenna } a] \text{ and } [S(2n+1) \text{ from antenna } b] \\ \text{Signal on } RE(2n+1) = [S(2n+1) \text{ from antenna } a] \text{ and } [-S^*(2n) \text{ from antenna } b] \end{cases} \quad \text{[Equation 18]}$$

In Equation 18, S(k) denotes a k-th E-PDCCH modulation symbol, and S*(k) denotes a conjugate complex number of the k-th E-PDCCH modulation symbol S(k).

Although the STC precoding of Equation 18 is applied to the case in which the BS has two antennas (Antenna #a and Antenna #b), the two antenna ports may correspond to the first two antenna ports from among the CRS or CSI-RS antenna ports configured by the BS. That is, if the UE assumes CRS, Antenna #1 and Antenna #b may correspond to Antenna Port #0 and Antenna Port #1, respectively. If the UE assumes CSI-RS, Antenna #1 and Antenna #b may correspond to Antenna Port #15 and Antenna Port #16, respectively. In addition, it is obvious to those skilled in the art that the principles proposed by Equation 18 can be extended to two or more antennas.

Embodiment 1-4

When RLM for the precoding-based control channel is performed, the UE assumes that a UE-specific RS is directly measured and appropriate precoding is applied to the UE-specific RS, so that a link quality is estimated on the basis of this assumption.

The above-mentioned examples have described a method for performing RLM through the precoding-based control channel on the basis of CSI-RS or CRS. If DL transmission from the BS to the UE is not present, the UE-specific RS is not transmitted but CSI_RS and/or CRS can be transmitted. If a link quality of the precoding-based control channel is derived using CSI-RS or CRS, the BS can provide Tx power information (e.g., E-PDCCH Tx power compared to CRS or CSI-RS power) of the precoding-based control channel to the UE in advance.

This embodiment proposes a method for performing RLM using UE-specific RS. Generally, since the UE-specific RS is valid only in a frequency region in which the corresponding channel is transmitted, the BS may provide the UE with information related to transmission of the precoding-based control channel serving as a target of RLM. For example, an RB set to which E-PDCCH serving as an RLM target is transmitted, an antenna port of a UE-specific RS used for E-PDCCH transmission, a scramble sequence parameter, and/or information of a transmit (Tx) mode applied to E-PDCCH may be applied to the UE. Specifically, Tx-associated information (e.g., RB set, antenna port, etc.) of the precoding-based control channel serving as the RLM target may be configured independently from other Tx-associated information actually applied to the precoding-based control channel received by the corresponding UE configured to detect control information. (That is, the above two Tx-associated information may be identical to or different from each other.) Alternatively, the above two Tx-associated information may be some parts of Tx-associated information actually applied to the precoding-based control channel. The UE performs channel estimation using the UE-specific RS on the basis of the above information, so that it can estimate/assume precoding information to be applied to a DL channel. As a result, the UE estimates the decoding error probablity of the precoding-based control channel on the basis of the estimated/assumed precoding result, so that the UE can perform RLM.

Embodiment 2

Embodiment 2 proposes a method for performing more accurate RLM in consideration of resources to which the precoding-based control channel is mapped.

If there are various precoding-based control channel types (e.g., E-PDCCH) as shown in FIG. 9, it is determined that RLM is performed only for one of the precoding-based control channel types, resulting in simplification of UE implementation. For example, the UE may inform the UE of the E-PDCCH type to be used for RLM through higher layer signaling such as RRC signaling. Alternatively, the E-PDCCH type to be used for RLM may be predetermined or fixed without additional signaling. For example, specific information indicating that only the DL allocation transmission type (e.g., E-PDCCH of FIG. 9) is used for RLM only may be predetermined as necessary. Alternatively, other information indicating that only a transmission type (e.g., E-PDCCH1 of FIG. 9) based on a first slot having a relatively small number of OFDM symbols used for E-PDCCH transmission is used for RLM may be predetermined as necessary.

In the case of RLM based on the precoding-based control channel, predetermined assumption for a time domain to which the precoding-based control channel is transmitted may be applied to the above RLM. For example, it may be assumed that E-PDCCH is transmitted on a predetermined number of OFDM symbols from the viewpoint of RLM. In more detail, it is possible to use one assumption that all OFDM symbols of a specific subframe are used for E-PDCCH transmission, or other assumption that the remaining OFDM symbols other than first N OFDM symbols (where N=1, 2, or 3) of a specific subframe are used for E-PDCCH transmission. The above-mentioned description does not indicate that actual E-PDCCH transmission is performed on specific OFDM symbols, but indicates UE assumption for RLM. Accordingly, although the number of OFDM symbols used for actual E-PDCCH transmission is changed to another number (due to a change of a PDCCH length), the UE RLM operation may be constantly performed according to the above assumption without being affected by the changed number. Here, information regarding the number of E-PDCCH Tx OFDM symbols to be assumed from the viewpoint of RLM may be transferred to the UE through higher layer signaling such as RRC signaling. Meanwhile, since a limited number of OFDM symbols can be used for E-PDCCH transmission within a special subframe (See FIG. 1(b)) present between DL/UL subframes in the TDD system, the special subframe may be excluded from a resource region serving as an RLM target.

When CRS and/or CSI-RS may be transmitted within a target subframe of the RLM, the number of REs available for the precoding-based control channel may be changed to another number. The decoding error probability result may be changed in response to assumption indicating the number of precoding-based control channel Tx REs. Accordingly, assumption regarding the number of REs through which the precoding-based control channel can be transmitted is of importance to RLM. RS configuration or RS overhead (the number of REs occupied by CRS and/or CSI-RS) regarding CRS and/or CSI-RS may be changed per subframe, such that the UE operation can be simplified on predetermined assumption of RS configuration or RS overhead for RLM. For example, the UE (optimistically) assumes that CRS and/or CSI-RS are not present in the E-PDCCH transmission region, such that the UE can perform RLM. Alternatively, in order to confirm a radio link quality even when the UE has a small number of E-PDCCH Tx REs, CRS and/or CSI-RS occupy many REs in the E-PDCCH transmission region (on pessimistic assumption), such that RLM may be carried out according to this assumption. From the viewpoint of pessimistic assumption, predetermined RS overhead is assumed in the same manner as in 4-port CRS or 8-port CSI-RS so that RLM may be carried out. The above CRS and/or CSI-RS configuration and/or overhead information may be pre-applied to the UE through higher layer signaling such as RRC signaling.

Embodiment 3

Embodiment 3 proposes a method for selectively or simultaneously using RLM based on the legacy PDCCH and another RLM based on the precoding-based control channel.

Although the precoding-based control channel (e.g., E-PDCCH) is used as shown in FIG. 9, the UE may decode the legacy PDCCH. For example, PDCCH including scheduling information received by all UEs of the cell can be transmitted on a common search space in the same manner as in system information. Although the UE is regarded as a UE capable of decoding E-PDCCH, some control information can be received through the legacy PDCCH. If the UE decodes both PDCCH and E-PDCCH as described above, it is necessary for a link quality measurement reference to indicate either one of PDCCH or E-PDCCH or both of PDCCH and E-PDCCH, so that RLM can be correctly carried out.

Accordingly, if the UE decodes both PDCCH and E-PDCCH (or if the UE has such capability for decoding PDCCH and E-PDCCH), this embodiment proposes a method for allowing the BS and the UE to share a link quality estimation reference.

For example, the BS may inform the UE of specific information indicating whether RLM is performed using one of PDCCH and E-PDCCH through higher layer signaling such as RRC signaling.

In another example, the UE may perform RLM using both PDCCH and E-PDCCH. For example, if each of one link quality ($Q_{PDCCH}$) estimated using PDCCH and another link quality ($Q_{E\text{-}PDCCH}$) estimated using E-PDCCH is lower than a predetermined threshold value ($Q_{out}$), this means that a radio link quality from the viewpoint of RLM is less than the threshold value ($Q_{out}$) or the occurrence of "out-of-sync" may be determined. If at least one of $Q_{PDCCH}$ and QE-PDCCH is less than $Q_{out}$, the occurrence of "out-of-sync" from the viewpoint of RLM may be decided. Alternatively, a link quality for representing $Q_{PDCCH}$ and $Q_{E\text{-}PDCCH}$ is estimated (or a link quality of a mean value is estimated). If the corresponding representative link quality is less than a predetermined threshold value ($Q_{out}$), the occurrence of "out-of-sync" from the viewpoint of RLM may be determined.

In addition, a predetermined threshold value applied to RLM based on PDCCH may be defined as $Q_{out\_1}$, and a predetermined threshold value applied to RLM based on E-PDCCH may be defined as $Q_{out\_2}$. In this case, $Q_{PDCCH}$ is compared with $Q_{out\_1}$, and $Q_{E\text{-}PDCCH}$ is compared to $Q_{out\_2}$. If $Q_{PDCCH}$ is less than $Q_{out\_1}$ and $Q_{E\text{-}PDCCH}$ is less than $Q_{out\_2}$, the link quality from the viewpoint of RLM may also be determined to be "out-of-sync" from the viewpoint of RLM. Alternatively, $Q_{PDCCH}$ is compared with $Q_{out\_1}$, and $Q_{E\text{-}PDCCH}$ is compared with $Q_{out\_2}$. If at least one of the two comparison results is less than a threshold value ($Q_{out\_1}$ or $Q_{out\_2}$), a radio link quality from the viewpoint of RLM may be determined to be "out-of-sync" from the viewpoint of RLM.

Similarly, if both $Q_{PDCCH}$ and $Q_{E\text{-}PDCCH}$ are higher than a predetermined threshold value ($Q_{in}$), this means that a radio link quality from the viewpoint of RLM is higher than $Q_{in}$ or the occurrence of "in-sync" may be determined. If at least one of $Q_{PDCCH}$ and $Q_{E\text{-}PDCCH}$ is less than $Q_{in}$, the occurrence of "in-sync" from the viewpoint of RLM may be decided. Alternatively, a link quality for representing $Q_{PDCCH}$ and QE-PDCCH is estimated (or a link quality of a mean value is estimated). If the corresponding representative link quality is higher than a predetermined threshold value ($Q_{in}$), the occurrence of "in-sync" from the viewpoint of RLM may be determined.

In addition, a predetermined threshold value applied to RLM based on PDCCH may be denoted by $Q_{in\_1}$, and a predetermined threshold value applied to RLM based on E-PDCCH may be denoted by $Q_{in\_2}$. In this case, $Q_{PDCCH}$ is compared with $Q_{in\_1}$, and $Q_{E\text{-}PDCCH}$ is compared to $Q_{in\_2}$. If $Q_{PDCCH}$ is higher than $Q_{in\_1}$ and $Q_{E\text{-}PDCCH}$ is less than $Q_{in\_2}$, the link quality from the viewpoint of RLM may also be determined to be "in-sync" from the viewpoint of RLM. Alternatively, $Q_{PDCCH}$ is compared with $Q_{in\_1}$, and $Q_{E\text{-}PDCCH}$ is compared with $Q_{in\_2}$. If at least one of the two comparison results is less than a threshold value ($Q_{in\_1}$ or $Q_{in\_2}$), a radio link quality from the viewpoint of RLM may be determined to be "in-sync" from the viewpoint of RLM.

If a link quality of only one control channel from among PDCCH and E-PDCCH is less than a threshold value (or if the occurrence of "out-of-sync" from the viewpoint of RLM is decided), the UE may inform the BS of this fact through the other control channel (i.e., through UL transmission controlled by the other channel). The BS having received the above-mentioned information may switch current configuration to another in such a manner that various information transmitted through a control channel having a poor link quality is transmitted through another control channel. For example, when the UE performs RLM of the BS which transmits control information transmitted within a common search space through a PDCCH, if a link quality of PDCCH is less than a threshold value, the UE may inform the BS of the poor link quality through a PUSCH corresponding to a UL grant received through E-PDCCH. The BS having received the above information may perform configuration switching in such a manner that control information transmitted within a common search space can be transmitted through E-PDCCH.

Further, the UE may periodically or aperiodically report channel status information (CSI) of a specific control channel (e.g., E-PDCCH) to the UE. Channel status information (CSI) of a specific control channel may report either the E-PDCCH decoding error probability at a current channel status or the aggregation level satisfying a predetermined error probability (e.g., error probability of 1%). For such reporting, the UE must estimate the E-PDCCH error probability according to a given channel status. For this purpose, the above assumption (e.g., PDSCH precoding can also be applied to E-PDCCH) described in the above-mentioned embodiments may be used. In association with the UE reporting, precoding information for channel status information (CSI) of E-PDCCH may be implemented by reusing other precoding information (or codebook) defined for PDSCH.

In addition, link quality information (or bits) of E-PDCCH may be contained in CSI reporting of PDSCH.

Embodiment 4

Embodiment 4 proposes a method for correctly and efficiently performing RLM when the CoMP scheme is applied to a control channel. If the BS performs the CoMP operation, inter-cell interference (ICI) of a control channel (e.g., PDCCH and/or E-PDCCH) can be reduced. JT, CS/CB, DCS, etc. may be used as the CoMP scheme applicable to the BS.

If the UE operation is configured according to the CoMP operation of the BS, the CoMP operation of the BS is assumed and a link quality is estimated while the UE performs RLM. For example, if the UE is configured to perform JT feedback (e.g., if inter-cell CSI for enabling signals transmitted from multiple cells to be sufficiently combined with each other is fed back, the UE assumes that a control channel (PDCCH and/or E-PDCCH) is transferred from cell(s) participating in JT so as to estimate a link quality.

For the CoMP operation, the BS estimates interference of a specific resource (e.g., a resource corresponding to zero-power CSI-RS configuration, as a restricted measurement resource), such that the BS may enable the UE to perform CQI calculation. In this case, the specific resource may correspond to a resource element (RE) capable of minimizing or muting Tx power of the corresponding cell, and the UE can measure interference from other cells using the corresponding resource. If specific resources for interference estimation are configured as described above, the UE may derive the link quality for RLM using interference estimated for the specific resource.

In addition, if multiple interference resources (i.e., resources to be used for interference measurement) are configured to calculate multiple CQIs, the BS may inform the UE of specific information indicating which one of multiple interference resources will be used for RLM execution. Specific information indicating interference resources related to such RLM execution may be provided to the UE through higher layer signaling such as RRC signaling. Alternatively, priority of multiple interference resources is predetermined, and interference resources having the highest priority (e.g., the lowest index) may be related to RLM.

The above-mentioned UE RLM operation may be restrictively applied to a control channel structure to which the CoMP control channel transmission and the interference measurement resource configuration are applied. For example, the above-mentioned UE RLM operation may be restrictively applied to E-PDCCH having a format similar to that of PDSCH.

Meanwhile, if DCS is applied to a control channel (PDCCH and/or E-PDCCH), the UE performs blind decoding (BL) of a control channel from multiple cells participating in DCS so that the UE can receive control information. In this case, the UE estimates a link quality of each cell, and calculates the final link quality using the estimated result, such that the UE can perform RLM on the basis of the final link quality. Embodiment 4 shows a method for allowing the BS and the UE to share a predetermined rule related to link quality estimation when the UE decodes a PDCCH from multiple cells.

For example, the UE may inform the UE of specific information indicating which cell will be used for RLM through higher layer signaling such as RRC signaling, and the UE performs RLM for the indicated cell(s) so that it may inform the BS of the RLM result. Alternatively, after the UE performs RLM or each cell, the UE may report the RLM result to a primary serving cell. The UE may report the RLM results for individual cells in parallel, or may simultaneously report the RLM results. In accordance with the scheme for integrating measurement results of a plurality of cells, if all link qualities of multiple cells are less than $Q_{out}$, this means that a radio link quality from the viewpoint of RLM becomes deteriorated or the occurrence of "out-of-sync" may be decided. Alternatively, if at least one of link qualities of multiple cells is less than $Q_{out}$, the occurrence of "out-of-sync" from the viewpoint of RLM may be decided. Similarly, if all link qualities of multiple cells are higher than $Q_{in}$, this means that a radio link quality from the viewpoint of RLM becomes improved or the occurrence of "in-sync" may be decided. Alternatively, if at least one of link qualities of multiple cells is higher than $Q_{in}$, the occurrence of "in-sync" from the viewpoint of RLM may be decided.

If a link quality of only one cell from among multiple cells is less than a threshold value (or if "out-of-sync" from the viewpoint of RLM is decided), the UE may inform the BS of this fact through the other cell (i.e., through UL transmission controlled by the other cell). The BS having received this reporting information may switch current configuration to another in such a manner that various information transmitted through a control channel having a poor link quality is transmitted through a control channel of another cell. For example, when the UE performs RLM of the BS which transmits control information transmitted within a common search space on Cell #1, if a link quality of a control channel of Cell #1 is less than a threshold value, the UE may inform the BS of this fact through a PUSCH corresponding to a UL grant received on Cell #2. The BS having received the above information may perform configuration switching in such a manner that control information transmitted within a common search space can be transmitted through a control channel of Cell #2.

Alternatively, the operation for reporting the RLM results of individual cells in parallel or collectively may cause unexpected load to the UE, such that a method for simplifying this reporting operation may be considered. For example, the BS selects only one representative cell from among multiple cells through higher layer signaling such as RRC signaling, and may inform the UE of a specific command for performing RLM of only one representative cell. Specifically, if each cell transmits CSI-RS and the UE performs CSI measurement and RLM on the basis of the CSI-RS transmission result, the BS selects a representative CSI-RS configuration through higher layer signaling such as RRC signaling, and commands the UE to perform RLM on the basis of the estimated link quality using CSI-RS caused by the corresponding CSI-RS configuration. The above-mentioned scheme can be more efficiently used when multiple transmission points (TPs) share the same cell ID and individual TPs are identified from each other according to different CSI-RS configurations (for example, CSI-RS pattern, Tx period, offset, antenna port, etc.). For example, in association with multiple TPs configured to share the same cell ID, one optimum TP appropriately for a control channel (e.g., PDCCH and/or E-PDCCH) which is transmitted to the UE according to Tx power of each TP and the distance from each TP to the UE may be determined. In this case, if CSI-RS of the determined one TP is set to a representative CSI-RS, the UE may perform RLM for only the representative CSI-RS without the necessity of performing RLM in parallel to multiple CSI-RSs.

In accordance with the above-mentioned example described on the basis of multiple cells, multiple CSI-RS configurations may be given to the corresponding UE from the viewpoint of one UE. For example, the BS may inform the UE of specific information indicating which CSI-RS configuration(s) from among multiple CSI-RS configurations will be used for RLM execution. The UE may report the RLM result based on multiple CSI-RS configurations in parallel or collectively. In the case in which at least one or all of link qualities estimated using multiple CSI-RS configurations is less than $Q_{out}$, this case may be denoted by "out-of-sync". In the other case in which at least one or all of link qualities estimated using multiple CSI-RS configurations is higher than $Q_{in}$, this case may be denoted by "in-sync". Alternatively, under the condition that a representative CSI-RS related to RLM from among multiple CSI-RS configurations may be decided, RLM may be carried out using the corresponding representative CSI-RS only.

Embodiment 5

Embodiment 5 shows examples to which UE RLM operations shown in the above-mentioned embodiments are applied.

Assuming that the precoding-based control channel (e.g., E-PDCCH) operates on the basis of UE-specific RS, the UE may measure/estimate SINR of the resource region to which the UE-specific RS is transmitted. Meanwhile, a reference threshold value (e.g., $Q_{out}$) of RLF may be independently configured according to the Tx scheme (e.g., one Tx diversity or one beamforming) applied to E-PDCCH. The RLF threshold value according to the Tx scheme may be constructed in the form of a lookup table, and this lookup table may include SINR information corresponding to $Q_{out}$ defined for each Tx scheme. In addition, the above-mentioned lookup table may further include specific information in which elements affecting the E-PDCCH coding rate are considered, and this information may be represented by an effective coding rate. For example, the elements affecting the E-PDCCH coding rate may include transmission or non-transmission of CRS and CSI-RS, the number of antenna ports of CRS and CSI-RS, the number of OFDM symbols for PDCCH transmission, and transmission or non-transmission of other principal channel/signals (BCH, PSS/SSS, paging, etc.). In addition, if the E-PDCCH transmission condition (for example, a transmission scheme, etc.) of the UE and the SINR measurement/estimation values of the UE-specific RS are determined according to the schemes described in the above-mentioned embodiments, the UE may perform RLM measurement (in which the E-PDCCH link quality is higher/less than $Q_{out}$) of a current subframe. The following Table 3 shows an example of the lookup table related to $Q_{out}$.

TABLE 3

| Effective | Transmit diversity mode | | | Beamforming mode | | |
|---|---|---|---|---|---|---|
| Coding Rate | $ECR_{0-0}$ | $ECR_{0-1}$ | $ECR_{0-2}$ | $ECR_{1-0}$ | $ECR_{1-1}$ | $ECR_{1-2}$ |
| $Q_{out}$(SINR) | $SINR_{0-0}$ | $SINR_{0-1}$ | $SINR_{0-2}$ | $SINR_{1-0}$ | $SINR_{1-1}$ | $SINR_{1-2}$ |

In Table 3, $ECR_{0-0}$ is a coding rate to which the remaining signals other than E-PDCCH and UE-specific RS are not applied. $ECR_{0-1}$ is a coding rate for use in the case in which 4-port CRS is additionally transmitted, and $ECR_{0-2}$ may correspond to a coding rate for use in the other case in which SCH is additionally transmitted. If the set of RSs related to E-PDCCH, the number of symbols used in the PDCCH region, a condition of the E-PDCCH type, etc. are fixed in advance, the E-PDCCH effective coding rate for various conditions need not be configured, so that the lookup table can be reduced in size.

When the link quality measured/estimated on the basis of the control channel (PDCCH and/or E-PDCCH) of RLM is compared with $Q_{in}$, the lookup table in which the control channel transmission condition similar to that of Table 3 is considered is constructed, and RLM measurement (i.e., comparison between $Q_{in}$ and a control channel link quality) may be performed in consideration of the lookup table in which the effective coding rate is considered. Accordingly, the RLM operations can be more efficiently and correctly carried out in various conditions.

Figure 10:
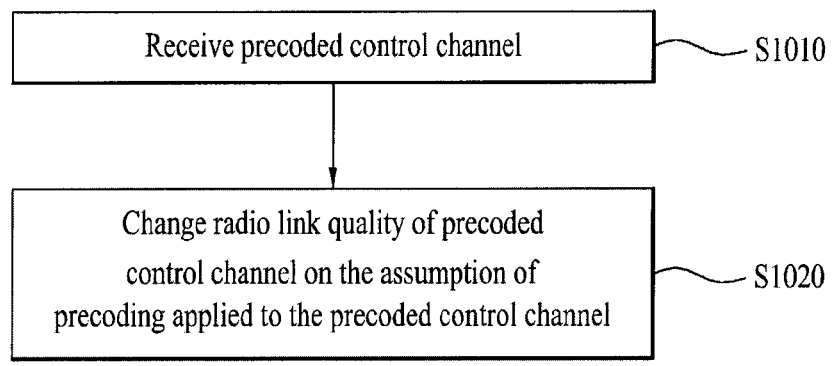
FIG. 10 is a flowchart illustrating an RLM method according to one embodiment of the present invention.

FIG. 10 is a flowchart illustrating an RLM method according to one embodiment of the present invention.

Referring to FIG. 10, the UE may receive the precoded control channel (e.g., E-PDCCH). The precoding information applied to the precoded control channel may be transparent to the UE. The UE may demodulate the precoded control channel on the basis of the channel estimated from the UE-specific RS.

In step S1020, the UE may assume the precoding applied to the precoded control channel, and may measure a radio link quality of the precoded control channel on the basis f this assumption.

The above-mentioned RLM method shown in FIG. 10 may be implemented such that above described various embodiments of the present invention may be independently applied or two or more embodiments thereof may be simultaneously applied and a repeated description is omitted for clarity.

Figure 11:
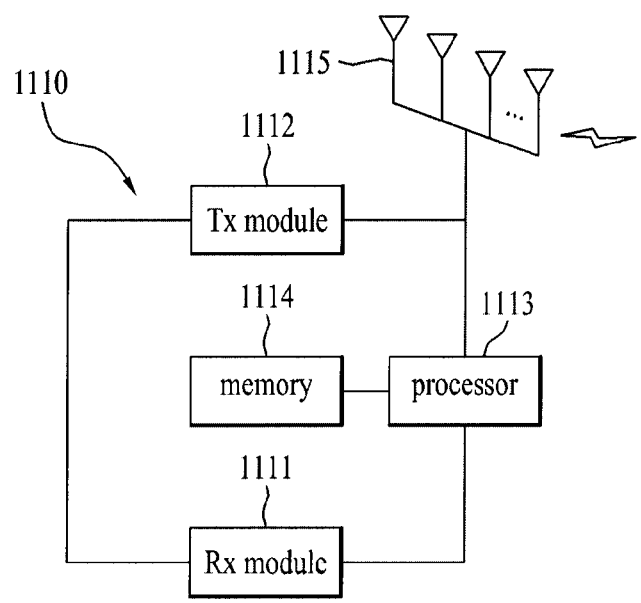
FIG. 11 is a block diagram illustrating a transceiver apparatus applicable to embodiments of the present invention.

FIG. 11 illustrates a configuration of a transceiver according to an embodiment of the present invention.

Referring to FIG. 11, a transceiver 1110 according to an embodiment of the present invention may include a reception (Rx) module 1111, a transmission (Tx) module 1112, a processor 1113, a memory 1114 and a plurality of antennas 1115. The reception (Rx) module 1111 may be configured to receive various signals, data and information from an external device. The transmission module 1112 may be configured to transmit various signals, data and information to the external device. The processor 1113 may control overall operation of the transceiver 1110 and may be configured to execute a function of processing information transmitted/received between the transceiver 1110 and the external device. The memory 1114 may store the processed information for a predetermined time and may be replaced by a component such as a buffer (not shown). The antennas 1115 can support MIMO transmission (Tx) and reception (Rx).

The transceiver 1110 according to an embodiment of the present invention may be configured to perform Radio Link Monitoring (RLM). The processor 1113 of the transceiver 1110 may be configured to receive the precoded control channel through the Tx module. In addition, the processor 1113 may be configured to estimate a radio link quality of the received precoded control channel. In this case, the above-mentioned radio link quality may be estimated on the basis of UE assumption of the precoding operation applied to the precoded control channel.

The transceiver 1110 may be implemented such that the above-described embodiments of the invention can be independently applied thereto or two or more of the embodiments can be simultaneously applied thereto and descriptions of redundant parts are omitted for clarity.

The transceiver 1110 shown in FIG. 11 may be a UE configured to perform RLM of a downlink from a BS or a relay, or may be a relay configured to perform RLM of a downlink from a BS.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The above-mentioned embodiments can be applied to various mobile communication systems.

The invention claimed is:

1. A method for performing radio link monitoring (RLM) by a user equipment (UE) in a wireless communication system, the method comprising:
    receiving a precoded control channel from a base station (BS); and
    estimating a radio link quality of the received precoded control channel,
    wherein the radio link quality is estimated on the basis of UE assumption associated with precoding applied to the precoded control channel,
    wherein the UE assumption indicates that the precoding is carried out using a space-time code scheme,
    wherein a $2n^{th}$ resource element of the precoded control channel includes a $2n^{th}$ modulation symbol transmitted from a first antenna of the BS and a $(2n+1)^{th}$ modulation symbol transmitted from a second antenna of the BS,
    wherein a $(2n+1)^{th}$ resource element of the precoded control channel includes a $(2n+1)^{th}$ modulation symbol transmitted from the first antenna and a negative conjugate of a $2n^{th}$ modulation symbol transmitted from the second antenna, and
    wherein n is an integer equal to or greater than 0.

2. The method according to claim 1, wherein information regarding the precoding applied to the precoded control channel is transparent to the user equipment (UE).

3. The method according to claim 1, wherein the precoded control channel is an Enhanced-Physical Downlink Control Channel (E-PDCCH).

4. A user equipment (UE) for performing radio link monitoring (RLM) in a wireless communication system, comprising:
    a reception (Rx) module configured to receive a downlink signal from a base station (BS);
    a transmission (Tx) module configured to transmit an uplink signal to the BS; and
    a processor configured to control the UE including the reception (Rx) module and the transmission (Tx) module,
    wherein the processor receives a precoded control channel through the reception (Rx) module, estimates a radio link quality of the received precoded control channel,
    wherein the radio link quality is estimated on the basis of UE assumption associated with precoding applied to the precoded control channel,
    wherein the UE assumption indicates that the precoding is carried out using a space-time code scheme,
    wherein a $2n^{th}$ resource element of the precoded control channel includes a $2n^{th}$ modulation symbol transmitted from a first antenna of the BS and a $(2n+1)^{th}$ modulation symbol transmitted from a second antenna of the BS,
    wherein a $(2n+1)^{th}$ resource element of the precoded control channel includes a $(2n+1)^{th}$ modulation symbol transmitted from the first antenna and a negative conjugate of a $2n^{th}$ modulation symbol transmitted from the second antenna, and
    wherein n is an integer equal to or greater than 0.

* * * * *